(12) United States Patent
Kim et al.

(10) Patent No.: US 7,953,018 B2
(45) Date of Patent: May 31, 2011

(54) METHOD OF CONTROLLING TRANSMIT POWER FOR RETRANSMISSION PACKET IN UPLINK DEDICATED CHANNEL

(75) Inventors: Bong Hoe Kim, Ansan-Si (KR); Joon Kui Ahn, Seoul (KR); Hak Seong Kim, Seoul (KR); Dong-Wook Roh, Seoul (KR); Dong Youn Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 904 days.

(21) Appl. No.: 11/229,178

(22) Filed: Sep. 15, 2005

(65) Prior Publication Data

US 2006/0067279 A1 Mar. 30, 2006

(51) Int. Cl.
*H04L 12/26* (2006.01)
*H04B 7/216* (2006.01)

(52) U.S. Cl. ........ 370/252; 370/253; 370/335; 370/336; 370/341; 370/348

(58) Field of Classification Search .......... 370/252–253, 370/335–336, 341, 348
See application file for complete search history.

(56) References Cited

U.S. PATENT DOCUMENTS

| 7,161,916 | B2 * | 1/2007 | Malladi et al. ................ 370/332 |
| 2003/0193913 | A1 | 10/2003 | Murata et al. |
| 2004/0137930 | A1 | 7/2004 | Kim et al. |
| 2005/0013263 | A1 * | 1/2005 | Kim et al. ..................... 370/320 |
| 2005/0237932 | A1 * | 10/2005 | Liu ............................... 370/230 |
| 2005/0276266 | A1 * | 12/2005 | Terry ............................ 370/394 |

FOREIGN PATENT DOCUMENTS

| KR | 1020040063057 | 7/2004 |
| WO | 02/041531 | 5/2002 |
| WO | 03/028277 | 4/2003 |
| WO | 03/041317 | 5/2003 |
| WO | WO 03/043221 | 5/2003 |
| WO | 03/049320 | 6/2003 |
| WO | WO 03/096581 | 11/2003 |
| WO | 2004/002007 | 12/2003 |
| WO | 2004/064304 | 7/2004 |

* cited by examiner

*Primary Examiner* — Charles N Appiah
*Assistant Examiner* — Emem Stephen
(74) *Attorney, Agent, or Firm* — Lee, Hong, Degerman, Kang & Waimey

(57) ABSTRACT

A method of transmitting a data packet based on a transport format combination set (TFCS) using a hybrid automatic repeat request (HARQ) is disclosed. In the method, a user equipment (UE) receives a TFCS from a base station (BS) to select a transport format combination (TFC) for retransmitting a data packet and selects from the TFCS a TFC which corresponds to a maximum transmission power by which the data packet is retransmitted. Thereafter, the UE retransmits the data packet using the TFC of an initial transmission and a transmission power that corresponds to the TFC with the maximum transmission power of the TFCS.

12 Claims, 1 Drawing Sheet

METHOD OF CONTROLLING TRANSMIT POWER FOR RETRANSMISSION PACKET IN UPLINK DEDICATED CHANNEL

This application claims the benefit of Korean Application No. 10-2004-0073935, filed on Sep. 15, 2004, which is hereby incorporated by reference.

BACKGROUND OF THE INVENTION

1. Field of the Invention

The present invention relates to a method of controlling transmit power, and more particularly, to a method of controlling transmit power for retransmission packet in uplink dedicated channel.

2. Discussion of the Related Art

In the 3$^{rd}$ Generation Partnership Project (3GPP) Wideband Code Division Multiple Access (WCDMA), data transmitted via an uplink enhanced dedicated channel (E-DCH) is first channel coded and multiplexed in a physical channel before being transmitted via an enhanced dedicated physical data channel (E-DPDCH). Within the E-DPDCH frame, data of a plurality of dedicated channels can be transmitted after being multiplexed, and a format of multiplexing E-DCH data of the E-DPDCH is called transport format combination (TFC).

FIG. 1 is an example illustrating a process of channel coding and multiplexing data of E-DCH to E-DPDCH. In the physical layer, the E-DPDCH frame is I/Q multiplexed with a dedicated physical control channel (DPCCH). Thereafter, the multiplexed E-DPDCH and DPCCH is transmitted. The transmission of DPCCH includes various control information, including the TFC information of the DPDCH, uplink power control, and pilot signal for data demodulation.

A transmission power of the E-DPDCH is determined relative to the transmission power of the uplink DPCCH. In the standards of the 3GPP WCDMA, the ratio of the E-DPCCH and the DPCCH transmission powers is defined by a β-factor. The β-factor is further defined by $\beta_{ed}$, which represents transmission amplitude of the E-DPDCH, and $\beta_c$, which represents transmission amplitude of DPCCH. The ratio of the E-DPDCH transmission power relative to the transmission power of the DPCCH is determined according to $(\beta_{ed}/\beta_c)^2$. According to the current standard, the β-factor value of $(\beta_{ed}/\beta_c)$ can be determined using two methods.

A first method relates to assigning the β-factor value to each TFC in the upper layer. A second method relates to assigning the β-factor value only to basic TFCs in the upper layer, and regarding other TFCs, determining the β-factor value based on the β-factor values for the basic transport format combinations (TFCs) and other information. In these two methods, the β-factor value is determined as semi-static according to each TFC. Moreover, the relative transmission power of the E-DPDCH is determined based on the DPCCH. A more detailed description on how to calculate the β-factor and the β-factor value from the TFC is explained in the 3GPP standard.

A TFC, which is permitted to transmit in uplink DCH, is determined from the upper layer. A set of TFCs is referred to as TFCS. Subsequently, a TFCS assigned from an upper layer is defined as $TFCS_{RNC}$. In a physical layer of a user equipment (UE), each TFC is determined and updated to ascertain whether the TFC can actually be used for transmission. This is accomplished by taking into consideration information such as a β-factor value and a maximum transmission power of a UE corresponding to each TFC of the $TFCS_{RNC}$. After the determination, if a set of TFCs, which have been determined fit to be used for transmission, is called $TFCS_{UE}$. Thereafter, the UE transmits only to the TFC belonging to both $TFCS_{RNC}$ and $TFCS_{UE}$.

With respect to Node B scheduling, Node B continuously controls TFCS available for transmission to uplink via enhanced uplink dedicated channel (E-DCH) for each UE in order to maintain a certain level of interference in an uplink direction. For example, if the uplink interference is relatively small, a TFC requiring high transmission power can be transmitted, while if the uplink interference is relatively large, then a TFC requiring high transmission power can be prohibited from transmitting. Through such control, a certain level of uplink interference can be controlled and maintained.

In addition to controlling the TFCS of each UE, Node B can also directly control transmission power permitted to each UE. In other words, Node B execute scheduling to each UE by limiting the transmission power of the E-DPDCH or a ratio of transmission power of E-DPCCH at a specified point. From this situation, a UE can acquire a TFCS, which can transmit within a transmission power level set by Node B, by using a β-factor at each uplink e-DCH transmission point.

With respect to E-DCH, $TFCS_{RNC}$, $TFCS_{UE}$, and $TFCS_{NodeB}$ exist. In detail, the $TFCS_{RNC}$ are permitted to transmit by a Radio Network Control (RNC), the $TFCS_{UE}$ are managed by the UE, and $TFCS_{NodeB}$ are controlled by Node B. The UE can transmit data using a TFC format which can be included in all three aforementioned TFCSs at a specified point.

An application of a hybrid automatic repeat request (HARQ) of the physical layer in the E-DCH has been considered. In HARQ, Node B transmits feedback in form of acknowledgment (ACK)/no acknowledgment (NACK) to notify a UE whether decoding of data packet via E-DCH was a success or not. Generally, assuming the previous transmission was unsuccessful, Node B discards previously unsuccessful decoding attempt and performs decoding operation on the retransmitted data packet. However, in HARQ, assuming the previous transmission was unsuccessful, Node B stores the unsuccessfully decoded data packet in the buffer and performs decoding operation after the retransmitted data packet with previously unsuccessfully decoded data packet are combined using various methods. By using the decoding operation of HARQ, decoding capability and efficiency is improved. The 3GPP standard provides a detailed explanation of HARQ methods.

As explained above, the transmission power of E-DPDCH corresponds to the transmitted TFC, which multiplexes data of E-DCH to E-DPDCH, and is semi-statically fixed to the relative value of DPCCH. When E-DCH packet is retransmitted, the TFC is same as the initial TFC, and as a result, the β-factor value also remains the same. By applying this scheme to E-DCH transmission, the transmission power ratio of E-DPDCH with respect to DPCCH remains same even in retransmission of data packet compared to the very first transmission of the same data packet.

However, considering transmission of E-DCH packet in HARQ, previously unsuccessfully decoded E-DCH packet is combined with retransmitted E-DCH packet and the combined E-DCH packet is decoded. Therefore, based on signal-to-interference ratio of the previous data packet, the transmission power of the retransmission packet can be controlled. For example, if the signal-to-interference ratio of the previously transmitted but unsuccessfully decoded data packet is 6 and the signal-to-interference ratio for successful decoding is 7, the retransmission of the data packet can be transmitted by lowering the transmission power to satisfy the signal-to-interference ratio of 1 (7−6=1).

On the other hand, it is possible for the communication system to experience instability if a large amount of data packets are transmitted at a same specified time. Because there is more likelihood of unsuccessful decoding of data packets, in turn causing increased number of retransmission. If the number of retransmissions increases, Node B could prohibit retransmission or reduce transmission power of the retransmitted data packet, in order to stabilize the communication system.

SUMMARY OF THE INVENTION

Accordingly, the present invention is directed to a [title] that substantially obviates one or more problems due to limitations and disadvantages of the related art.

An object of the present invention is to provide a method of transmitting a data packet based on a transport format combination set (TFCS) using a hybrid automatic repeat request (HARQ).

Another object of the present invention is to provide a method of transmitting a data packet based on a transmission power rate using a hybrid automatic repeat request (HARQ).

A further object of the present invention is to provide a method of receiving a data packet based on a transport format combination set (TFCS) using a hybrid automatic repeat request (HARQ).

Another object of the present invention is to provide a method of receiving a data packet based on a transmission power rate using a hybrid automatic repeat request (HARQ).

A further object of the present invention is to provide a method of transmitting a data packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a data packet based on a transport format combination set (TFCS) using a hybrid automatic repeat request (HARQ) which includes a user equipment (UE) receiving a TFCS from a base station (BS) to select a transport format combination (TFC) for retransmitting a data packet. Furthermore, the UE selects from the TFCS a TFC which corresponds to a maximum transmission power by which the data packet is retransmitted, and retransmits the data packet using the TFC of an initial transmission and a transmission power that corresponds to the TFC with the maximum transmission power of the TFCS.

In another aspect of the present invention, the UE receives a first TFCS from a base station (BS) to select a transport format combination (TFC) for transmitting a data packet and thereafter selects from the first TFCS the TFC which corresponds to a transmission power by which the data packet is transmitted. Next, the UE transmits the data packet using the transmission power that corresponds to the selected TFC. The UE then receives a second TFCS to select a TFC for retransmitting the data packet and selects from the second TFCS a TFC which corresponds to a maximum transmission power by the data packet is retransmitted. Lastly, the UE transmits the data packet using the TFC of the first TFCS and a transmission power that corresponds to the TFC with the maximum transmit power of the second TFCS.

In another aspect of the present invention, a base station (BS) transmits a second TFCS to each user equipment (UE). The second TFCS is used for the UE to determine a transport format combination (TFC) for retransmitting the data packet. Also, the TFC corresponds to a transmission power by which the data packet is retransmitted. Furthermore, the BS receives the retransmitted data packet having a same TFC with the first transmission and a transmission power that corresponds to the TFC of the second TFCS.

Yet in another aspect of the present invention, the BS transmits a first TFCS to each user equipment (UE) for the UE to determine a transport format combination (TFC) for transmitting a data packet and decodes the data packet transmitted from the UE. Furthermore, the BS transmits a Negative Acknowledgment (NACK) signal to request the UE to retransmit the first data packet. Thereafter, the BS transmits a second TFCS to each user equipment (UE). The second TFCS is used by the UE to determine a transport format combination (TFC) for retransmitting the data packet. Also, the TFC corresponds to a transmission power by which the second data packet is retransmitted. Lastly, the BS receives the retransmitted data packet having a same TFC with the first transmission and a transmission power that corresponds to the TFC of the second TFCS.

In another aspect of the present invention, a method of transmitting a data packet based on a transmission power rate using a hybrid automatic repeat request (HARQ) is introduced. In the method, a user equipment (UE) receives a range of transmit power for retransmitting the data packet. Thereafter, the UE selects a maximum transmit power from the range of transmit power for retransmitting the data packet, and then retransmits the data packet using the selected transmission power and a transport format combination (TFC) of a first transmission. Here, the first transmission is used to transmit the data packet.

In another aspect of the present invention, the UE receives a first range of transmit power for transmitting the data packet. Thereafter, the UE selects a transmit power from the first range of transmit power for transmitting the data packet. Next, the UE transmits the data packet using the selected transmission power and a transport format combination (TFC) that corresponds to the selected transmission power. The UE then receives a second range of transmit power for retransmitting the data packet and selects a maximum transmit power from the second range of transmit power for retransmitting the data packet. Lastly, the UE retransmits the data packet using the selected transmission power and a transport format combination (TFC) of the first transmission. Here, the first transmission is used to transmit the data packet.

Yet in another embodiment of the present invention, a base station (BS) transmits a range of transmit power for retransmitting the data packet. Thereafter, the BS receives the retransmitted data packet based on a maximum transmit power selected from the range of transmit power and a transport format combination (TFC) of an initial transmission. Here, the initial transmission is used to transmit the data packet.

In another aspect of the present invention, a method of transmitting a data packet is introduced. In the method, a user equipment (UE) retransmits a second data packet based on a transmission power used to transmit a first data packet if a scheduling information for retransmitting the second data packet is not received. Here, the first data packet and the second data packet are same.

Yet in another aspect of the present invention, the UE receives a scheduling information for transmitting the first data packet, Here, the scheduling information includes a transport format combination set (TFCS). Thereafter, the UE selects from the TFCS a transport format combination (TFC) which corresponds to a transmission power for transmitting the data packet and retransmits a second data packet based on the transmission power used to transmit a first data packet if a second scheduling information for retransmitting the second data packet is not received. Here, the first data packet and the second data packet are same.

In another embodiment of the present invention, the UE receives a scheduling information for transmitting a first data packet. Here, the scheduling information includes a range of transmission power by which the first data packet is transmitted. Thereafter, the UE selects a transmission power from the range of transmission power for transmitting the first data packet. Here, the selected transmission power corresponds to a transport format combination (TFC). The UE then retransmits a second data packet based on a transmission power used to transmit a first data packet if a scheduling information for retransmitting the second data packet is not received. Here, the first data packet and the second data packet are same.

In another aspect of the present invention, a user equipment (UE) retransmits the data packet according to a transmission power provided in a scheduling information for retransmitting the data packet if a difference between a transmission power used to transmit a data packet and a maximum transmission power used to retransmit the data packet is significant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
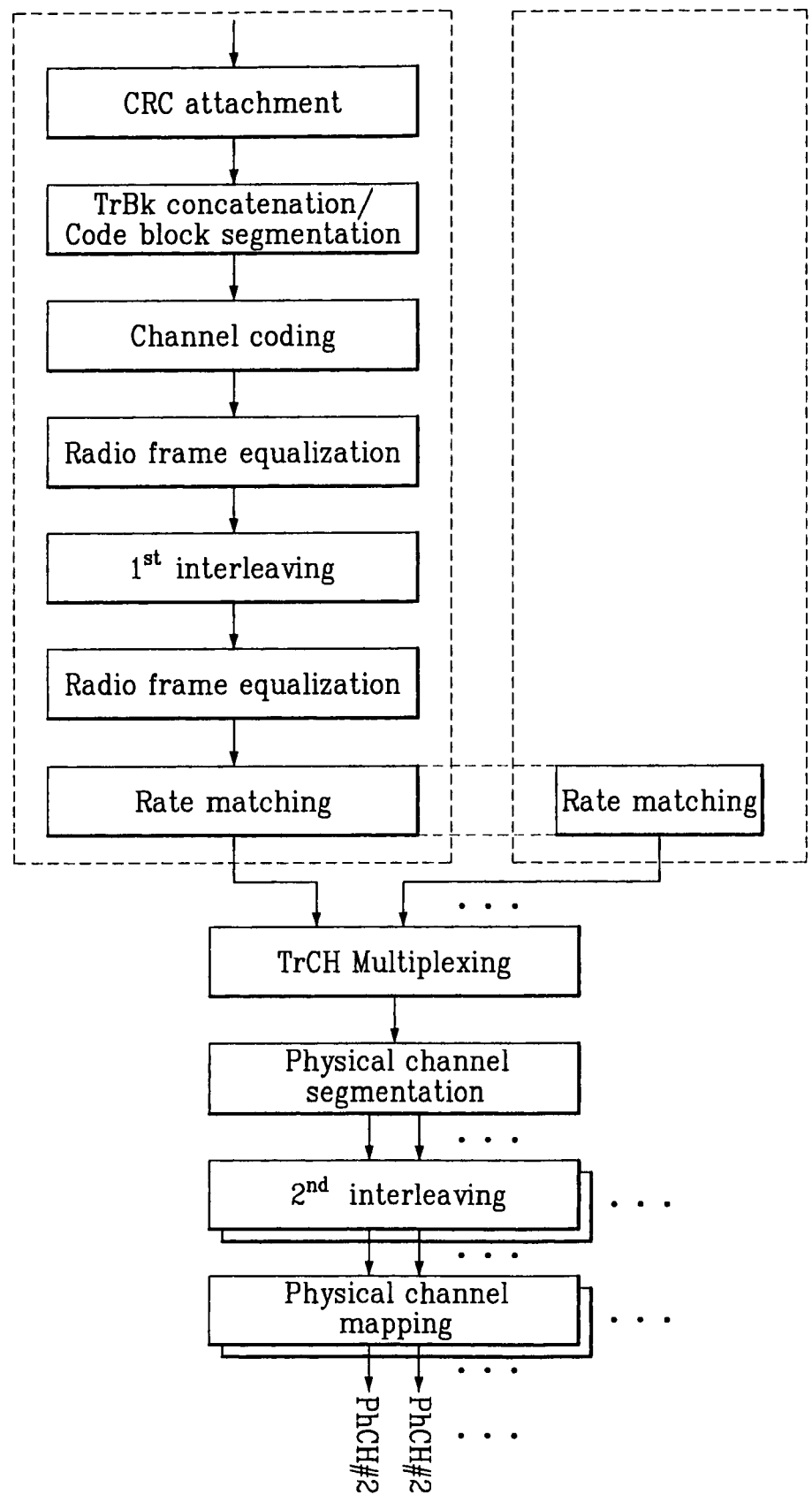
FIG. 1 an example illustrating a process of channel coding and multiplexing data of DCH to E-DPDCH.

Reference will now be made in detail to the preferred embodiments of the present invention, examples of which are illustrated in the accompanying drawings. Wherever possible, the same reference numbers will be used throughout the drawings to refer to the same or like parts.

An embodiment of the present invention relates to controlling transmission power of retransmitting uplink E-DCH packet. In this embodiment, Node B provides scheduling for a transport format combination set (TFCS). Hereafter, the TFC can be referred to as a data rate or a modulation-coding combination.

Node B transmits to each UE a $TFCS_{NodeB}$ (Node B can transmit a maximum rate TFC rather than transmit total $TFCS_{NodeB}$) which controls the transmission of uplink E-DCH packet of each UE. Here, the TFC of the retransmitted E-DCH packet is same as the TFC of first transmitted E-DCH packet. Also, The retransmitted E-DCH packet is the same E-DCH packet as the first transmitted E-DCH packet. Consequently, Node B does not need to provide the UE, which retransmits the E-DCH packet, with the $TFCS_{NodeB}$. However, according to the embodiment of the present invention, Node B provides the UE, which retransmits the E-DCH packet, with the $TFCS_{NodeB}$ so that the UE can use the $TFCS_{NodeB}$ to set the transmission power by which the data packet is retransmitted.

The $TFCS_{NodeB}$ sets a range of TFCs from which a UE can choose a TFC to transmit a data packet. Here, the range can be represented by a TFC corresponding to a maximum transmission power (or data rate) and a TFC corresponding to a minimum transmission power (or data rate). By selecting a TFC having the maximum transmission power rate, the UE can transmit a data packet at the maximum transmission power (or data rate).

In operation of transmitting (not retransmitting) an E-DCH packet, a UE selects an appropriate TFC, which corresponds to a specific transmission power, from the range of TFCs set by the $TFCS_{NodeB}$. Moreover, the UE uses $(\beta_{ed}, \beta_c)$ value, which corresponds to the selected TFC, to set the E-DPDCH transmission power. Here, the $\beta_{ed}$ and $\beta_c$ represents a β-factor of E-DPDCH and DPCCH, respectively. Thereafter, the UE transmits the E-DCH packet according to the transmission power ratio between E-DPDCH and DPCCH corresponding to the selected TFC.

After Node B receives the transmitted data packet, the data packet is decoded to determine whether the data can be successfully read. If the data packet is unsuccessfully decoded, Node B requests the UE retransmit the data packet.

When retransmission of the E-DCH packet occurs, the TFC which corresponds to the retransmitted E-DCH packet is the same TFC as the TFC which relates to the first or initially transmitted E-DCH packet. Here, even if the TFC is no longer in the range of TFCs set by the $TFCS_{NodeB}$ at the time of retransmission, the UE can still retransmit the E-DCH packet using the TFC which corresponds to the initially transmitted E-DCH packet. As discussed above, retransmission of the data packet takes place after the data packet is received but unsuccessfully decoded by Node B. In operation, Node B transmits a Negative Acknowledgment (NACK) signal to the UE. As such, what the present embodiment introduces is that $(\beta_{ed}, \beta_c)$ value used in determining the transmission power rate for retransmitting E-DCH packet is not determined by the TFC, but according to $(\beta_{ed,\ MAX}, \beta_{c,\ MAX})$ Here, $(\beta_{ed,\ MAX}, \beta_{c,\ MAX})$, which is the β values which provides maximum transmit power ratio of $\beta_{ed}/\beta_c$ among $(\beta_{ed}, \beta_c)$ values of the TFCs included in the $TFCS_{NodeB}$, is used to determine the transmission power. To put differently, the transmission rate of the TFC of the $TFCS_{NodeB}$ having the highest or strongest transmission power is used as the transmission rate. Accordingly, the ratio of $\beta_{ed}, \beta_c$ can be smaller or larger than the initial transmission. Especially, the $(\beta_{ed}, \beta_c)$ values for the first or initial transmission can be used if the power ratio $\beta_{ed,\ MAX}/\beta_{c,\ MAX}$ is larger than the power ratio $\beta_{ed}/\beta_c$ of the first or initial transmission.

In other words, the E-DCH packet can be retransmitted at a lower transmission power than the initial transmission of the E-DCH packet. A new range of TFCs for retransmission is set by the $TFCS_{NodeB}$ at the time of retransmission. Here, the new range includes a TFC corresponding to a maximum transmission power. The maximum transmission power can be same or lower than the initial transmission power. However, since Node B retains the E-DCH packet information from the initial transmission, Node B can decode the E-DCH packet received at a lower transmission power.

In the past, regardless of the $TFCS_{NodeB}$ at the time of retransmission, a transmit power (or transmit power ratio $\beta_{ed}/\beta_c$) for retransmission of the E-DCH packet was the same as the TFC which corresponds to the initial E-DCH packet transmission. For example, if a transmit power of a first data packet transmission is at 7 dB and a maximum transmission power is set at 4 dB by Node B at the time of retransmission, the data packet would be retransmitted at 7 dB, despite the maximum transmission rate of 4 dB set by Node B at the time of retransmission.

Another embodiment of the present invention relates to Node B providing scheduling of a maximum transmission power (or power ratio related to a control channel) of an E-DPDCH for transmission of E-DCH packet. In this embodiment, the E-DCH packet transmission is controlled by a range of transmission power provided to each UE by Node B. In other words, Node B provides a range of transmission power within which the UE can transmit an E-DCH packet. The range of transmission power includes a maximum transmission power within which the UE can choose to transmit the data packet. Because the retransmitted E-DCH packet is the same E-DCH packet as the first transmitted E-DCH packet, the TFC of the retransmitted E-DCH packet is same as the TFC of the initially transmitted E-DCH packet. Consequently, Node B does not need to provide the retransmitting UE with the range of transmission power within which to transmit the E-DCH packet. However, in the present embodiment, Node B provides a maximum transmit power (or maximum transmit power ratio $\beta_{ed}/\beta_c$) to the retransmitting UE, and the retransmitting UE uses the maximum transmit power (or maximum transmit power ratio $\beta_{ed}/\beta_c$) to determine the transmission power for the E-DCH packet being retransmitted.

When transmitting the E-DCH packet (not retransmitting), the UE determines the necessary transmission power for transmitting a TFC of each E-DCH by using a $(\beta_{ed}, \beta_c)$ value. After determining the transmission power, the UE selects a TFC that corresponds to the transmission rate in a range of transmission rates set by Node B and uses $(\beta_{ed}, \beta_c)$ corresponding to the selected TFC to determine the transmission power by which to make the transmission. Thereafter, the UE transmits the E-DCH packet according to the determined transmission power.

When retransmitting the E-DCH packet, the UE selects a maximum $(\beta_{ed}, \beta_c)$ value with maximum power ratio $\beta_{ed}/\beta_c$ that corresponds to the transmission power of a range of transmission power set by Node B. In other words, the maximum $(\beta_{ed}, \beta_c)$ value selected by the UE does not exceed the maximum transmission rate set by Node B. Moreover, the ratio of $\beta_{ed}, \beta_c)$ can be smaller or larger than the initial transmission. Especially, the $(\beta_{ed}, \beta_c)$ value for the first or initial transmission can be used if the maximum power ratio is larger than the power ratio $\beta_{ed}, \beta_c$ of the first or initial transmission.

In another embodiment of the present invention, Node B schedules transmission power for retransmitting a data packet. Node B can control a transmission power of E-DCH packet being retransmitted by providing a $TFCS_{NodeB}$ or a maximum allowed transmission power to a UE at the time of retransmission. Here, Node B transmits scheduling command to the UE not only at the time of initial transmission of the E-DCH packet, but also at the time of retransmission of the same E-DCH packet. As a result, transmissions of scheduling commands from Node B increases since Node B transmits the same scheduling command at retransmission. By using a following transmission scheme, a number of transmissions of scheduling commands from Node B can be decreased.

According to the first scheme, a UE does not have to receive a scheduling command from Node B at the time of retransmission. If the UE does not receive a retransmission scheduling command, the UE can use the same transmission power as the transmission power of the initial transmission. Alternatively, the UE can use a transmission power, which has been modified (or rate controlled) slightly from the initial transmission power using an offset provided in advance from an upper layer. Thereafter, the retransmission packet can be transmitted using either the same transmission power or the transmission power modified using the offset.

In the second scheme, different from the first scheme, a UE can receive a scheduling command from Node B at the time of retransmission. In this case, the UE transmits the retransmission packet according to the scheduling command.

Here, Node B would transmit a scheduling command to the UE if Node B determines necessary to change the transmission power a specified amount at the time of retransmission. The specified amount can be significant or nominal. For example, if there is no change from the initial transmission power to the retransmission power, Node B would not transmit a scheduling command to the UE. However, if there is change from the initial transmission to the retransmission power, Node B can transmit a scheduling command to command UE to retransmit at a different transmission power. As a result to controlling transmission of scheduling command, transmissions of unnecessary scheduling commands can be prevented.

In another embodiment of the present invention, a UE can control the TFCS. With respect to E-DCH packet being retransmitted, a $TFCS_{UE}$, which is controlled by the UE and comprises a set of transmission available TFCs, is not considered in determining a transmission TFC. Here, even if the TFC of the data packet being retransmitted is not included the $TFCS_{UE}$, it is possible for the UE to retransmit the data packet. However, in regards to the data packet being retransmitted, the UE would have to determine the transmission power that is within the allowed range of transmission power and does not exceed the maximum transmission power provided in the range of transmission power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a data packet based on a transmission power using hybrid automatic repeat request (HARQ), the method comprising:

receiving first uplink scheduling information including a first range of transmission power from a base station (BS) for initial transmission of an uplink enhanced dedicated channel (E-DCH) data packet;

transmitting the uplink E-DCH data packet using a first transmission power determined from the first range of transmission power and a first transport format combination (TFC), wherein the first TFC is selected to correspond to the first transmission power;

receiving a negative acknowledgment (NACK) signal from the BS; and retransmitting the uplink E-DCH data packet using either a second transmission power and a second TFC selected to correspond to the second transmission power or the first transmission power and the first TFC, wherein the uplink E-DCH data packet is transmitted using the second transmission power and the second TFC selected to correspond to the second transmission power only if second uplink scheduling information including a second range of transmission power is received from the BS for retransmission of the uplink E-DCH data packet, wherein the uplink E-DCH data packet is transmitted using the first transmission power and the first TFC only if the second uplink scheduling information is not received from the BS, wherein the second transmission power is determined as a maximum transmission power from the second range of transmission power using a transmit power ratio for retransmitting the uplink E-DCH data packet, and wherein the second uplink scheduling information is received only when the first transmission power for transmitting the uplink E-DCH data packet must be changed.

2. The method of claim 1, wherein the transmit power ratio is determined by a βped factor of enhanced dedicated physical data channel (E-DPDCH) and a βc factor of dedicated physical control channel.

3. The method of claim 1, wherein the second range of transmission power includes the maximum transmission power and a minimum transmission power.

4. The method of claim 1, wherein the second TFC is selected from a transport format combination set (TFCS) for retransmitting the uplink E-DCH data packet.

5. The method of claim 1, wherein the uplink E-DCH data packet is retransmitted via an Enhanced Dedicated Channel (E-DCH).

6. The method of claim 1, wherein the first uplink scheduling information is transmitted from the BS with a predetermined period.

7. A method of transmitting a data packet based on a transmission power using hybrid automatic repeat request (HARQ), the method comprising:

transmitting first uplink scheduling information including a first range of transmission power to a mobile station (MS) for initial transmission of an uplink enhanced dedicated channel (E-DCH) data packet;

receiving the uplink E-DCH data packet transmitted by the MS, wherein the uplink E-DCH data packet is transmitted using a first transmission power and a first transport format combination (TFC) selected to correspond to the first transmission power;

transmitting a negative acknowledgment (NACK) signal to the MS;

determining whether the first transmission power must be changed for retransmitting the uplink E-DCH data packet;

transmitting second uplink scheduling information to the MS only if the first transmission power is determined to be changed, the second uplink scheduling information including a second range of transmission power for retransmitting the uplink E-DCH data packet; and receiving the retransmitted uplink E-DCH data packet from the MS, wherein the uplink E-DCH packet is retransmitted using either a second transmission power and a second TFC selected at the MS to correspond to the second transmission power or the first transmission power and the first TFC, wherein the uplink E-DCH data packet is transmitted using the second transmission power and the second TFC selected at the MS to correspond to the second transmission power only if the second uplink scheduling information including the second range of transmission power is transmitted to the MS, wherein the uplink E-DCH data packet is transmitted using the first transmission power and the first TFC only if the second uplink scheduling information is not transmitted to the MS, wherein the second transmission power is determined as a maximum transmission power from the second range of transmission power using a transmit power ratio, and wherein the second uplink scheduling information is not transmitted to the MS if the first transmission power is determined to not be changed.

8. The method of claim 7, wherein the transmit power ratio is determined by a βed factor of enhanced dedicated physical data channel (E-DPDCH) and a βc factor of dedicated physical control channel.

9. The method of claim 7, wherein the second range of transmission power includes the maximum transmission power and a minimum transmission power.

10. The method of claim 7, wherein the second TFC is selected from a transport format combination set (TFCS) for retransmitting the uplink E-DCH data packet.

11. The method of claim 7, wherein the uplink E-DCH data packet is retransmitted via an Enhanced Dedicated Channel (E-DCH).

12. The method of claim 7, wherein the first uplink scheduling information is transmitted from a BS with a predetermined period.

* * * * *